United States Patent
Paramore et al.

(10) Patent No.: US 7,109,912 B1
(45) Date of Patent: Sep. 19, 2006

(54) WEATHER RADAR HAZARD DETECTION SYSTEM AND METHOD

(75) Inventors: Steve Paramore, Cedar Rapids, IA (US); Daniel L. Woodell, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 210 days.

(21) Appl. No.: 10/838,290

(22) Filed: May 4, 2004

(51) Int. Cl.
*G01S 13/95* (2006.01)

(52) U.S. Cl. .................. 342/26 B; 342/176; 342/179; 342/181; 342/182

(58) Field of Classification Search ............. 342/26 R, 342/26 A–26 D, 176, 179–183, 195, 197; 340/949, 953, 955; 702/3
See application file for complete search history.

(56) References Cited

U.S. PATENT DOCUMENTS

| | | | |
|---|---|---|---|
| 4,835,536 A | 5/1989 | Piesinger et al. | 342/26 |
| 5,398,033 A * | 3/1995 | Michie | 342/26 B |
| 5,488,375 A * | 1/1996 | Michie | 342/26 B |
| 5,805,100 A | 9/1998 | Becker et al. | 342/26 |
| 5,907,568 A * | 5/1999 | Reitan, Jr. | 342/26 B |
| 6,043,756 A * | 3/2000 | Bateman et al. | 340/945 |
| 6,184,816 B1* | 2/2001 | Zheng et al. | 342/26 R |
| 6,199,008 B1* | 3/2001 | Aratow et al. | 701/120 |
| 6,201,494 B1 | 3/2001 | Kronfeld | 342/26 |
| 6,271,768 B1* | 8/2001 | Frazier et al. | 340/961 |
| 6,424,288 B1 | 7/2002 | Woodell | 342/26 |
| 6,441,773 B1 | 8/2002 | Kelly et al. | 342/26 |
| 6,448,922 B1 | 9/2002 | Kelly | 342/26 |
| 6,501,392 B1 | 12/2002 | Gremmert et al. | 340/971 |
| 6,512,476 B1 | 1/2003 | Woodell | 342/26 |
| 6,549,161 B1* | 4/2003 | Woodell | 342/26 R |
| 6,597,305 B1 | 7/2003 | Szeto et al. | 342/26 |
| 6,650,275 B1* | 11/2003 | Kelly et al. | 342/26 R |
| 6,653,947 B1 | 11/2003 | Dwyer et al. | 340/970 |
| 6,667,710 B1 | 12/2003 | Cornell et al. | 342/26 |
| 6,670,892 B1* | 12/2003 | Block | 340/963 |
| 6,683,541 B1* | 1/2004 | Staggs et al. | 340/961 |
| 6,690,317 B1 | 2/2004 | Szeto et al. | 342/26 |
| 6,703,945 B1* | 3/2004 | Kuntman et al. | 340/961 |
| 6,707,415 B1 | 3/2004 | Christianson | 342/26 |
| 6,720,906 B1 | 4/2004 | Szeto et al. | 342/26 |
| 2002/0039072 A1* | 4/2002 | Gremmert et al. | 340/945 |

OTHER PUBLICATIONS

"In-flight weather trending information: optimal looping characteristics for animated NEXRAD images", Lemos, K.; Chamberlain, J. Digital Avionics Systems Conference, 2004. DASC 04. The 23rd vol. 1, Oct. 24-28, pp. 5D4-1 to 5D4-12.*

"Radar synthetic vision system for adverse weather aircraft landing", Sadjadi, F.; Helgeson, M.; Radke, M.; Stein, G. Aerospace and Electronic Systems, IEEE Transactions on vol. 35, Issue 1, Jan. 1999 pp. 2-14.*

(Continued)

*Primary Examiner*—John B. Sotomayor
(74) *Attorney, Agent, or Firm*—Nathan D. Jensen; Kyle Eppele

(57) ABSTRACT

An aircraft weather radar system is disclosed. The system comprises a radar antenna, aircraft sensors, and a database. The system also comprises a processing device receiving information from the radar antenna and from the aircraft sensors and able to retrieve information from the database. Further, the system comprises a cockpit display coupled to the processing device. The processing device is programmed to determine storm system hazards and to display the storm system hazards on the display using an iconal representation or textual representation.

19 Claims, 3 Drawing Sheets
(1 of 3 Drawing Sheet(s) Filed in Color)

OTHER PUBLICATIONS

"Cockpit integration of uplinked weather radar imagery", Kelly, W.; Kronfeld, K.; Rand, T. Digital Avionics Systems Conferences, 2000. Proceedings. DASC. The 19th, 2000 pp.3D4/1-3D4/6 vol. 1.*

U.S. Appl. No. 10/631,253 for "Adaptive Weather Radar Detection System and Method Used in Continental and Maritime Environments" by Woodell et al., filed Jul. 31, 2003.

U.S. Appl. No. 10/631,316, for "Runway Obstacle Detection System and Method" by Woodell, filed Jul. 31, 2003.

U.S. Appl. No. 10/667,701, for "Enhanced Adaptive Weather Thresholds for Identification of Hazards System and Method" by Woodell et al., filed Sep. 22, 2003.

Patent Application for "Airborne Weather Radar System And Radar Display" by S. Paramore, Daniel L. Woodell and Sara Barber.

* cited by examiner

WEATHER RADAR HAZARD DETECTION SYSTEM AND METHOD

CROSS REFERENCE TO RELATED APPLICATIONS

The present application is related to co-filed application Ser. No. 10/838,291 filed on an even date herewith entitled "Airborne Weather Radar System and Radar Display" invented by Steve Paramore, Daniel L. Woodell and Sarah Barber. The co-filed application is incorporated by reference herein in its entirety.

BACKGROUND

Conventionally, pilots use weather radar to detect and then avoid hazardous weather. Conventional radar systems may produce the desired results only in a limited environment. Typically, airborne threshold systems are traceable to ground-based weather radar thresholds for wet precipitation generated from convective weather. As such, conventional aircraft radar systems are used to detect the amount of water in an air mass. Analysis of hazardous conditions due to the precipitation or other weather conditions is typically not done.

Conventionally, radar thresholds map radar return strength to a display with color representing rain rate or alternatively a weather threat assessment level. Conventionally, the threat level has been previously described as primarily a function of radar reflectivity and a weaker function of temperature, altitude, and latitude. Because of the ability of aircraft to circumnavigate storm system hazard, if recognized, it would therefore be desirable to provide an airborne radar system which has the ability to more accurately detect and report the existence and/or characteristics of storm system hazards. It may be possible for a pilot operating radar manually to be able to judge storm system hazards as each pilot becomes familiar with the environment and the weather radar equipment. However, knowledge by the pilot must be acquired, and further, an increase in pilot workload is also necessitated. Therefore, there is a need for an automated system of detecting, analyzing and communicating storm system hazards.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is an aircraft weather radar system. The system comprises a radar antenna, aircraft sensors, and a database. The system also comprises a processing device receiving information from the radar antenna and from the aircraft sensors and able to retrieve information from the database. Further, the system comprises a cockpit display coupled to the processing device. The processing device is programmed to determine storm system hazards and to display the storm system hazards on the display using an iconal representation or textual representation.

What is also provided is an aircraft weather radar system. The system comprises a radar means for providing radar returns, an aircraft sensor means for sensing environmental variables, and a database means for providing database information. The system also comprises a processing means for receiving information from the radar means and from the aircraft sensor means and able to retrieve information from the database. Further, the system comprises a cockpit display means coupled to the processing device for displaying hazard information. The processing means is programmed to determine storm system hazards and to display the storm system hazards on the display means using an iconal representation or textual representation.

Further, what is provided is a method of providing hazard information to a flight crew member. The method comprises providing radar returns from a radar antenna circuit. The method also comprises sensing environmental variables using an aircraft sensor and providing database information based on information from the sensor and based on the radar returns. Further, the method comprises processing received information from the radar antenna circuit and from the aircraft sensor and displaying hazard information on a cockpit display in accordance with commands from the processing step. The processing step determines storm system hazards and causes display of the storm system hazards on the display using an iconal representation or textual representation.

Alternative examples and other exemplary embodiments relate to other features and combination of features as may be generally recited in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
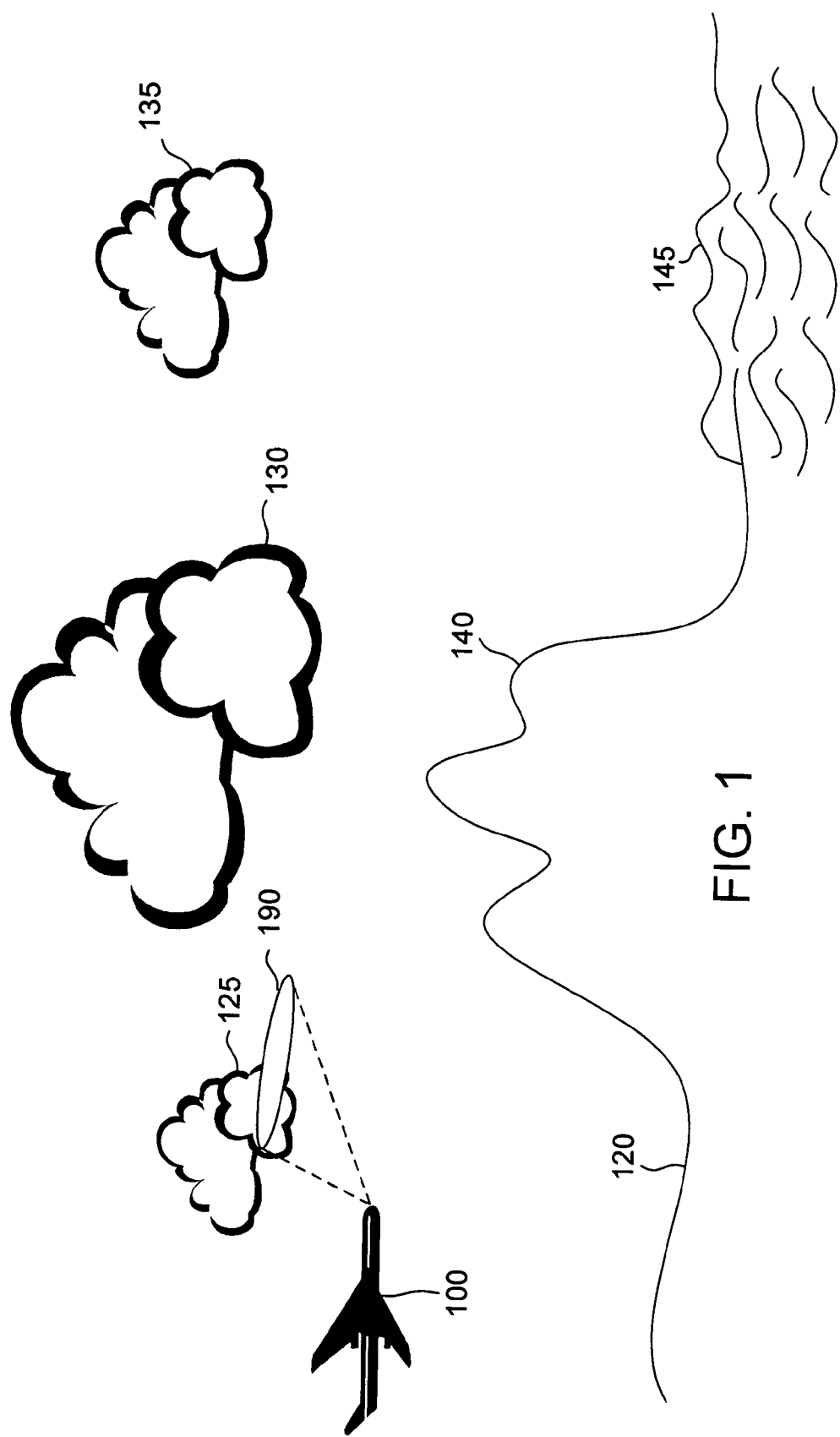
FIG. 1 is an exemplary diagram of an airplane having a weather radar system and flying in the atmosphere.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In conventional aircraft systems, air carriers wish to detect threatening weather which may be a threat to the aircraft or passengers. Such threatening weather may be detected using on-board weather radar systems, however, conventional systems are not well suited for determining hazardous regions of detected storm systems.

Referring to FIG. 1, an aircraft 100 is depicted having a radar on board capable of casting a radar beam 190 and receiving reflective energy from weather systems 125, 130, 135 and the like. Weather systems 125, 130, and 135 may be representative of any of a variety of type weather systems. Weather system 130 may be over a mountainous terrain 140, for example, weather system 125 may be over a plain-like environment 120, and weather system 135 may be over water.

Figure 2:
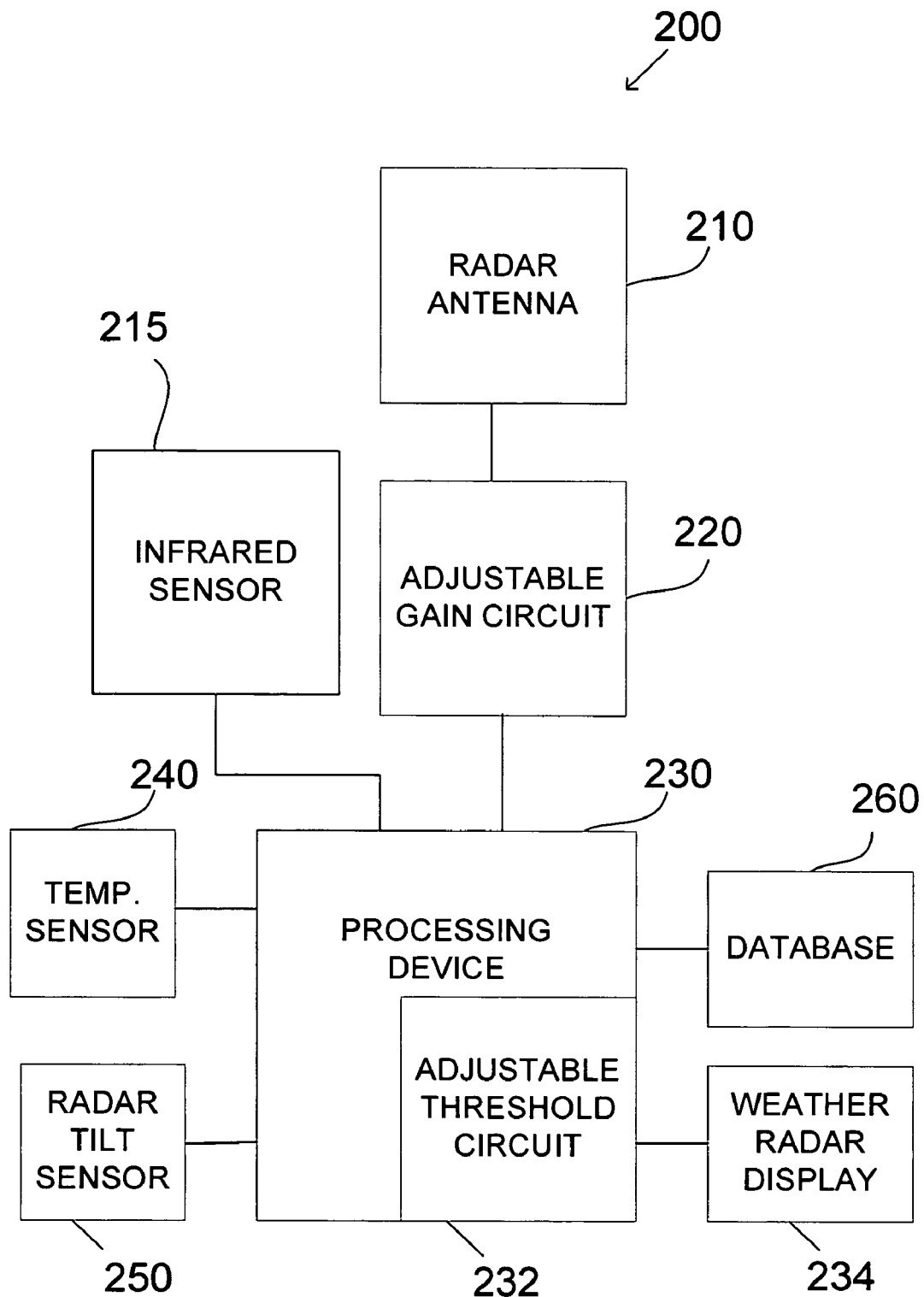
FIG. 2 is an exemplary block diagram of a radar system having an adjustable threshold circuit.

Referring now to FIG. 2, a radar system 200 includes a radar antenna 210 for sending and receiving radar signals. System 205 also includes an adjustable gain circuit 220 that is configured to change the gain of the radar signal provided to radar antenna 210. Further system 205 includes an infrared sensor 215. Processing device 230 receives temperature data from a temperature sensor 240 and radar tilt sensor 250. In an exemplary embodiment, processing device 230 also accesses a database 260 which contains information relating to the type of weather, based on the input from the weather radar 210 and infrared sensor 215. Processing device 230 may also be configured with instructions which calculate and/or determine an appropriate adjustable threshold command via a control law which is based on the type of weather or hazard being observed. The adjustable threshold command is to be communicated to an adjustable threshold circuit 232 based on data supplied to processing circuit 230 such as but not limited to the weather type, temperature inputs, and the radar beam direction. Further, other information such as latitude, location, time of day, time of year, etc. may also be used to make the gain adjustment. Database 260 may be used to determine the weather type or weather hazard being detected.

The radar returns may be normalized depending on the environment in which it is detected. This may be used for any type of weather radar that operates in a range of environments. This includes simple auto-tilt radars, manual radars, as well as fully automatic systems which use all possible environmental data including but not limited to the WXR-2100 multiscan radar available from Rockwell Collins of Cedar Rapids, Iowa.

Radar and sensors may be combined with database information and used to provide a hazard assessment of atmospheric conditions. The information may then be processed and refined and displayed in the cockpit in a standardized format, which may be iconal in nature, which requires less need for pilot interpretation. Some of the information which may be displayed includes:

1. Over Shooting Tops

Thunderstorm height has long been used as an indicator of a weather cell's potential hazard to an aircraft. This is because the low to mid-altitude updrafts that force the cell upward provide the energy to produce the entire vertical extent of a convective cell. At higher altitudes, air-masses may not produce lifting forces but be carried further aloft by the force of inertia. Therefore the higher the forcing updraft velocities, the higher the final cell height. Since higher updraft velocities produce both more extreme regions of turbulence and larger velocity shears as well as a higher probability of uplifting precipitation to produce hail, the higher the updraft velocity, the higher the risk to an aircraft operating in and around the convective cell. This is the source of the rule-of thumb that cell height is proportional to the hazard a cell presents to an aircraft. This general relationship fails to take into account the differences in atmosphere with changing latitudes. For a given altitude, cells at higher latitudes represent a higher threat level. This is especially true for cells that reach the height of the tropopause.

As cells grow though the troposphere, they may be energetic enough to reach the boundary between the troposphere and the stratosphere. The boundary between these two layers is called the tropopause and is marked by a change from the normal decreasing temperature with increasing height found in the troposphere to a steady or increasing temperature as height increases that is found in lower range of the stratosphere. This change in temperature at the tropopause tends to keep the tropospheric and stratospheric air-masses separate by decreasing the buoyancy of air masses that are convecting upward past the boundary, such as the top of a thunderstorm cloud. Because of this change in buoyancy at the tropopause, most thunderstorms that are energetic enough to reach the tropopause have their top of their structure spread out along the tropopause. Thunderstorms that have substantial updraft velocities as their airflow reaches this boundary may have portions of the storm cloud inertially carried well above the tropopause. This produces the characteristic "overshooting top" with most of the cell's cloud-top spread out at the tropopause with the regions of the highest updraft velocity pushing the cloud through the boundary. Cells with this signature have very high moderate altitude updraft velocities. These high velocities produce both substantial turbulence and the opportunity to produce hail.

So the general rule of height equals hazard for convective cells may be extended to the rule "All thunderstorms producing overshooting tops represent a hazard". This is important since high latitude cells may not be of a threat height when seen by a pilot skilled in tropic flying, but still may produce enough vertical velocity to produce an over-shooting top and are thus a hazard.

The detection of overshooting tops breaks into two sub-problem; detection and/or estimation of the height of the tropopause and determining cloud top height.

Tropopause height can be obtained from either ground based estimates or from some combination of on-aircraft based tropopause model and on-aircraft based sensor system. Ground based estimates of tropopause height are traditionally generated by either sounding data taken from balloon lofted radiosondes or by a VHF profiler. These products are merged together from all sources over a geographic area and are available for uplink to the aircraft. On aircraft produced estimates of tropopause height may range from a simple latitude model-based estimate, to a latitude/time of year model, a temperature estimate model of the tropopause temperature that may be used along with aircraft altitude and the current outside air temperature to produce an estimate, to a direct radiometric based measurement system that directly senses temperature at a range of altitudes above and below the aircraft.

The simplest on-aircraft produced estimate of tropopause height is model based, generated from a fixed estimate of tropopause height with changes in latitude. A simple model would assume a height of 9 kilometers at the Polar Regions, 11 kilometers at mid-latitudes and 17 kilometers over the tropics with a linear interpolation between these latitudes. Adding calendar information, models with higher fidelity can be produced. This allows the inclusion the mid-latitude summer to winter height variations of approximately 3 kilometers with the summer height being higher. In addition this may allow the estimation of large scale changes in height due to Hadley cell circulation. Next geographic and local insitu temperature information may be added to increase the tropopause model fidelity. In additional to model based estimates, estimates of tropopause height can be generated by either a microwave or infra-red ranging radiometer that is scanned vertically.

The second half of the overshooting tops detection problem is the estimation of convective cell height. Sensors which may be used for this function include direct video surveillance (by either an optical or infra-red camera for example IR sensor 215) or by weather radar 210. In all sensor cases the first step is to identify convective cells. Video based systems may be able to locate a weather cell in azimuth and elevation but may not be able to produce range information to the weather cell. Range information would be required to produce an estimate of altitude offset from the aircraft with offset altitude proportional to both range and the sine of the top of the cell image relative to the local horizon. Video information could be cooperatively used with weather radar data by associating radar range data with the angle information produced by the video source.

Weather radar can also be used to produce an estimate of cells height. This can be done by vertically scanning the weather cell and multiplying the sine of the antenna elevation angle where radar returns start/stop by the range to the target. This estimation can also be accomplished by a multiply azimuth scanned radar where each azimuth scan is taken from different beam elevations. In this case the range at which a weather feature either falls out of the beam or is first detected by the beam can be used along with the sine of the beam angle to produce an altitude offset estimate to the weather feature. Both of these methods are complicated by the width of the radar beam used on most aircraft. In both cases since the radar returns represent the convolution of the antenna beam with the sampled target, some limited deconvolution of the antenna beam from the radar return signal may be used to improve angular resolution.

An exemplary process for determining whether a convective cell hazard exists is described. The process includes determining an approximate height of the tropopause. Once the height of the tropopause is determined, convective cells are then identified. Once convective cells are identified, the height of the convective cells may then be determined. Whether convective cell hazards exist may then be determined and convective cell hazards may then be communicated to a pilot if necessary.

2. Vertical Development Above the Freezing Level

Convective weather cells generally begin to be detectable on weather radar at the freezing altitude in the atmosphere. As cells mature, the vertical extent of the cell and the updraft velocities that produce that vertical extent grow in magnitude. The increase in updraft velocities produce an increase in the threat level to an aircraft operating in and around the weather cell. Therefore cells that may be very detectable by on-board weather radar may not be a threat to an aircraft early in a cell's maturity cycle. As they mature and grow, they loft radar detectable precipitation to greater heights. In fact pilots use a common rule of thumb if weather exceeds some fixed radar reflectivity (30 dBz as an example) at a height greater than or equal where a known temperature is reached (−15 degree centigrade as an example), the cell should be considered energetic and thus a hazard to aircraft. Increases in radar reflectivity and increases in altitude past these design points imply greater threat potential to an aircraft. This detection of a cells having sufficient threat to warn a pilot about breaks down into several parts; identification/location of a target cell, estimation of radar reflectivity verses altitude, and estimation of the relative altitude of the aircraft to the point in the atmosphere where the desired temperature is reached. The radar reflectivity process used is the based on standard techniques. The remote estimation of the low temperature altitude is also based on the standard technique. That technique measures the temperature outside the aircraft.

Weather may be scanned either in elevation or in azimuth. When scanning in elevation, the azimuth location of the vertical scan must first be considered. A simple but time consuming strategy would be to densely scan the entire volume in front of the aircraft. Any weather detected at or above the desired altitude where the design temperature is reached can be considered a threat. This method may consume too much time for many situations. So instead of a dense scanning of the entire volume, weather cells can be identified first in a normal azimuth weather radar scan. Then only those azimuths which contain weather of interest may be vertically scanned. Range and antenna elevation angle may be used to estimate where the target temperature/altitude has been exceeded. When multiple azimuth beam are used at different antenna elevations, the portions of each antenna beam that sample above the target temperature/altitude may be used to identify regions of potential hazard.

3. Hail

The presence of Hail is currently inferred by several methods; by polarimetric radar, multiband radars, by models based on storm peak radar reflectivity. All three methods are currently used. The polarimetric radar examines weather at two polarizations, vertical and horizon. Large diameter rain drops fall with a pancake shape. This characteristic shape produces horizontal polarized radar returns somewhat larger that vertically polarized returns. Hailstones are irregular or spherical in shape and produce similar returns for both polarizations and thus allow discrimination between rain and hail. Multiband radars use the Raleigh scattering law to solve for average hydrometer diameter. This happens since radar returns are an inverse function of the sixth power of hydrometer diameter. Large hail can then be identified since raindrops above about 6 mm tend to breakup into many smaller drops. Current model based detection infers the probability of hail for weather cells with different peak radar reflectivities. As an example, a weather cell with 50 dBz reflectivity will produce ½ inch hail 30% of the time over the continental U.S. These US only models were derived for Air Force use during the late 1950s and early 1960s. Less rigorous models are used by pilots correlating cell height with hail likelihood (i.e. tall cells produce hail, therefore keep away).

These methods currently being used to either detect hail or infer the likelihood of hail suffer from several disadvantages for aircraft usage. Polarimetric detection requires the addition of an expensive selectable polarization antenna. MultiBand radars require the addition of what amounts to a second radar system on the aircraft. The reflectivity based model is limited by the use of continental coverage of the original data to the US in environments outside the US. It can also be fooled by high rain rate stratiform cases such as are typical in the tropics and some frontal situations that also produce high rain rates. What is thus needed is a system that combines the model based system with a measurement based system that can reduce the false alarm rate of a reflectivity only based hail inference system.

Hail requires long term updrafts to uplift hydrometers several times through the melting to freezing altitudes of a convective cell. Low velocity updrafts are not sufficient to keep the hydrometers aloft. As reported by Doviak and Zrnic (Second Edition *Doppler Radar and Weather Observations* pg 218) the estimated terminal fall velocity of hail can be estimated as;

V=:3.62*D**0.31 (V is in m/sec and D is in mm)

Solving this for ½ inch hail produces a terminal fall speed of about 13 meters per second. Updrafts less than this will not support a growing population of hail. Observational data further increases this value for hail generation to about 17 meters per second since the hail must not just be floated at a constant altitude but lofted through the wet to freezing altitudes several times. Although updraft velocity can not be directly measured by horizontal radar such as used on aircraft for weather surveillance, peak updraft velocity can be estimated from the spectral width measured by an airborne Doppler radar. Such radars already measure spectral width to infer turbulence in the potential path of an aircraft. Observations suggest the measured spectral width to be approximately 20% of the peak updraft velocity. So in the case of a 17 meter per second updraft, a spectral width about 3.5 meters per second will be measured by the weather radar.

Combining the reflectivity based hail model with a minimum measured spectral width in the same cell will allow hazards to be called while lowering the false alarm rate seen in reflectivity only model. So in the case of stratiform or frontal based non-convective weather, high radar reflectivity rates will not be paired with high spectral widths and be displayed to the pilot as non-hazardous.

4. Vaulted Thunderstorms

Vaulted precipitation can occur in two broad categories; during the early stages of a convective cell's life and as continuous phenomena that occur in severe thunderstorms such as a super-cell storm.

Vaulted precipitation in thunderstorms can occur early in a convective cell's lifetime as precipitation is held aloft by updraft activity. As the cell develops precipitation generally falls to earth starting from the height of the freezing altitude. Extreme vaulting is unusual and indicative of a high updraft velocity such as seen in super-cell thunderstorms and can occur both in early stages of the super-cell and continue to its mature stages. In all cases, there is a region at low altitudes where the radar does not detect precipitation but detection occurs above that region. For aircraft operating on the ground or at low altitudes, falling precipitation is very detectable as it falls though the low altitude radar's beam. Aircraft that will be operating at low altitudes may not have a radar detection of a thunderstorm producing a precipitation vault. The radar being used by the aircraft will generally sample underneath the regions of high radar returns. Even through precipitation may not be detectable along the radar beam it does not mean that substantial turbulence does not exist in that region because of strong updraft and downdraft activity. Therefore a strong convective cell should be considered hazardous to low flying aircraft even if radar returns at low altitudes do not indicate it to be severe. Cells showing extreme vaulting should always be considered extremely hazardous.

Vault detection is similar to storm top detection in that the radar can either be operated in a vertical scanned or multiple horizontally scanned modes. A vault can be detected when largest radar returns occur substantially above, say 10,000 kft or greater, than the freezing altitude. To reject non-convective weather that can produce low levels of mid level precipitation, a minimum floor of reflectivity should be assumed, such as 30 dBz. Isolated vaulting convective weather should be considered mildly hazardous to low flying aircraft. Vaulting associated with mature thunderstorms should be considered very hazardous for aircraft flying at all altitudes since this is the signature of very severe weather.

5. Air Mass Instability

It may also be desirable to make estimations of the level of instability of a particular air mass. Estimations of a particular cell may be determined via radar measurements. Growth rate, maximum height, spectral width, and other observable characteristics of a cell in a given air-mass can be used to infer the air-mass can support large scale convection and therefore potentially hazardous convective cells else where in the air mass. Thus a newly detected cell may be expected to grow to a similar level of hazard as another cell in the same air mass. This allows predictions of the level of hazard that a cell may attain before it fully exhibits that level of hazard.

6. Cell Growth Rate

In another methodology, growth rate of a cell may be desirable. The hazard which an aircraft is subjected may be inferred from the growth rate and height of a particular cell. These parameters may be difficult to measure at long ranges accordingly; long range estimates may be inferred from measured parameters of cells at shorter ranges. For example, it may be easy to measure growth rate of a particular cell within 40 nautical miles of an aircraft. For those growing cells outside of 40 nautical miles, growth rate and height may be inferred based on data collected within the 40 mile range. Long range cells that are growing will be increasing in range extent, azimuth extent, and peak reflectivity. From the inference, hazards may also be inferred.

7. Displays

Once it can be determined that certain storm system hazards may exist, it is desirable to communicate such hazards to flight crew in an easy-to-interpret format. Such hazards may be provided as icons on a weather radar display or icons or other indicators on a plan form or a vertical profile display.

Figure 3:
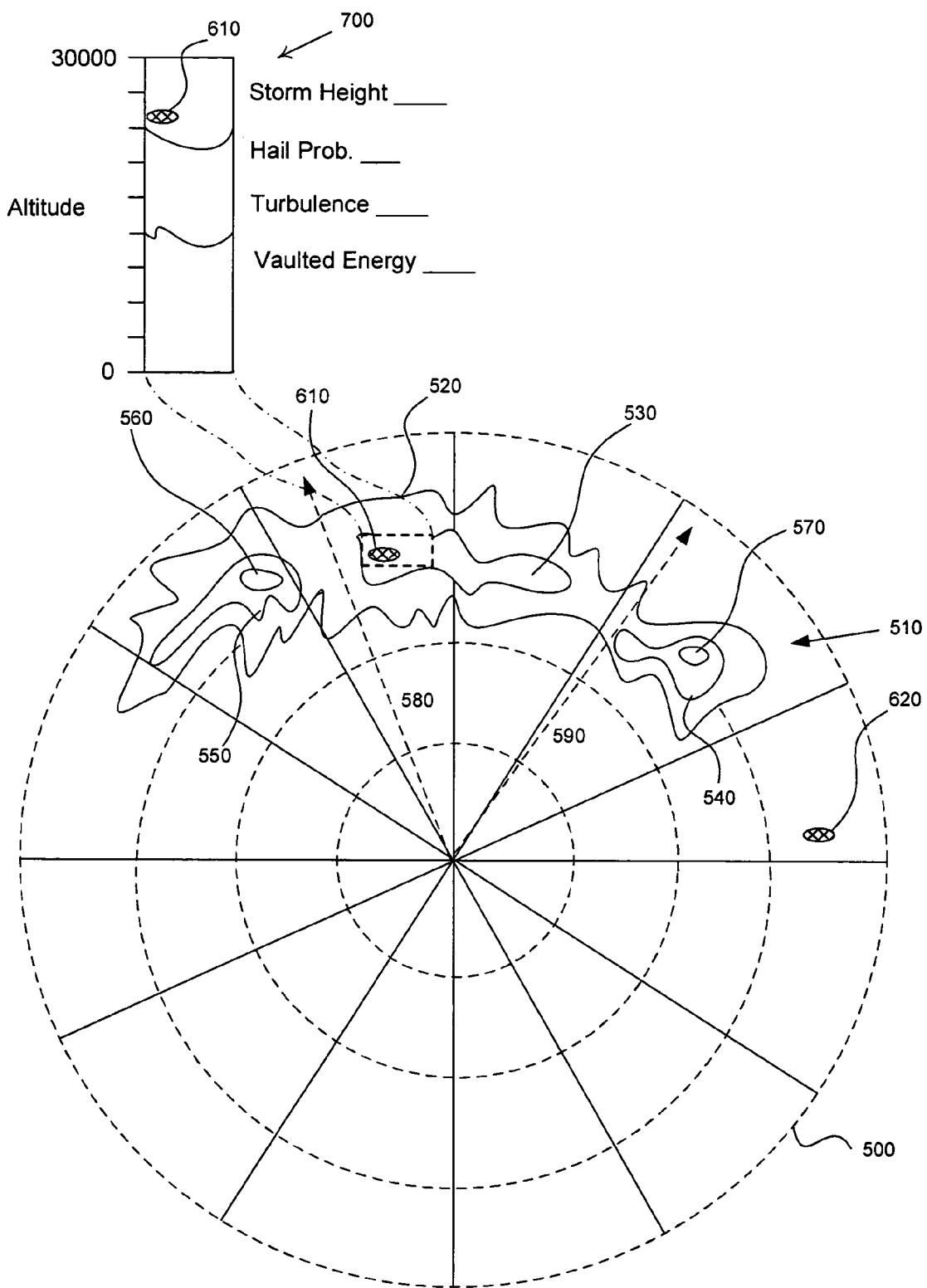
FIG. 3 is an exemplary depiction of a weather radar display.

Referring now to FIG. 3, a result whether radar display 500 depicts a line of thunderstorms 510. The thunderstorms 510 may have an outer fringe 520 showing the weaker areas of the storm system, with intermediate areas 530, 540, and 550 also being derived. Further, the strongest areas 560 and 570 may also be presented. Although the display may provide certain areas of a given strength of storm system, the conventional displays do not provide any indication of particular hazards. For example, over shooting tops, storms assembling above the freezing level, and hail may be represented by an icon 610, which reduces the required interpretation by the pilot. All of over shooting tops, storms assembling above the freezing level, and hail may all be represented by a single icon or alternatively may be represented by a plurality of icons identifying the particular hazards. It may also be desirable to represent clear air turbulence by an icon 620. Clear air turbulence may be detected by LIDAR or IR sensors. It may also be desirable to provide both a plan form and a vertical display of whether which may be iconally based. Further, it also may be desirable to represent only the icons with any representation of the storm systems, i.e., the other radar returns, on the radar screen. Further, it may be desirable to combine sensor information with a worldwide weather database to predict the true hazard of the weather that is encountered. Weather returns on the display may be adjusted to reflect the hazard of the storm, not the rainfall rate, which is how conventional provide an indication of hazard. Icons may be attached to the storm representation to provide real time hazard warnings.

It may also be desirable to provide a vertical profile display. Radars of today are capable of providing a vertical profile of weather. However, the vertical scan is often difficult to interpret and is not a standard way that pilots interpret radar. In an exemplary embodiment, the vertical scan may be replaced with an iconal representation of a cloud, with all the relevant hazard information attached to the presentation (storm height, hail probability, turbulence, vaulted thunderstorm energy, etc.). The display can thus be standardized. The interpretation of the hazard threat may be handled by the onboard sensors and the true hazard threat (not the actual vertical scan) and then be delivered to the flight crew.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft weather radar system, comprising:
   a radar antenna;
   optical aircraft sensors;
   a processing device receiving information from the radar antenna and from the aircraft sensors; and
   a cockpit display coupled to the processing device,
   wherein the processing device is programmed to determine storm system hazards and to display the storm system hazards on the display using an iconal representation or textual representation, wherein the storm system hazards are detected by using a cell height parameter for a cell, wherein the cell height parameter is determined by determining a direction to the cell using the optical aircraft sensor and a range to the cell using the information from the radar antenna.

2. The system of claim 1, wherein the hazards comprise overshooting tops.

3. The system of claim 1, wherein the hazards comprise vertical development.

4. The system of claim 1, wherein the hazards comprise hail.

5. The system of claim 1, wherein the hazards comprise vaulted thunderstorms.

6. The system of claim 1, wherein the hazards comprise air mass instability.

7. The system of claim 1, wherein the hazards comprise cell growth rate.

8. The system of claim 1, wherein the display utilizes a plan form to display hazards.

9. The system of claim 1, wherein the display utilizes a vertical profile to display hazards.

10. An aircraft weather radar system, comprising:
    a radar means for providing radar returns;
    an aircraft sensor means for sensing environmental variables;
    a processing means for receiving information from the radar means and from the aircraft sensor means; and
    a cockpit display means coupled to the processing device for displaying information,
    wherein the processing means is programmed to determine storm system hazards and to display the storm system hazards on the display means using an iconal representation or textual representation, wherein the storm system hazards are detected by using a cell height for a cell, wherein the cell height is determined by determining a direction to the cell using the aircraft sensor means and a range to the cell using the information from the radar means.

11. The system of claim 10, wherein the hazards comprise overshooting tops.

12. The system of claim 10, wherein the hazards comprise vertical development.

13. The system of claim 10, wherein the hazards comprise hail.

14. The system of claim 10, wherein the hazards comprise vaulted thunderstorms.

15. The system of claim 10, wherein the hazards comprise air mass instability.

16. The system of claim 10, wherein the hazards comprise cell growth rate.

17. The system of claim 10, wherein the display means utilizes a plan form to display hazards.

18. The system of claim 10, wherein the display means utilizes a vertical profile to display hazards.

19. A method of providing hazard information to a flight crew member, comprising:
    providing radar returns from a radar antenna circuit;
    sensing environmental variables using an optical aircraft sensor;
    processing received information from the radar antenna circuit and from the aircraft sensor to determine a direction to a cell using the environmental variables and a range to the cell using the radar returns;
    determining a cell height for the cell using the direction and the range; and
    displaying hazard information on a cockpit display,
    wherein the processing step determines storm system hazards using the cell height and causes display of the storm system hazards on the display.

* * * * *